United States Patent
Parvizi et al.

(10) Patent No.: US 11,173,850 B2
(45) Date of Patent: Nov. 16, 2021

(54) VEHICLE FORWARD SENSOR MODULE HOUSING AND COVER

(71) Applicants: Milad Parvizi, Windsor (CA); Charles Falzone, Auburn Hills, MI (US)

(72) Inventors: Milad Parvizi, Windsor (CA); Charles Falzone, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 222 days.

(21) Appl. No.: 16/660,969

(22) Filed: Oct. 23, 2019

(65) Prior Publication Data

US 2020/0130607 A1  Apr. 30, 2020

Related U.S. Application Data

(60) Provisional application No. 62/749,880, filed on Oct. 24, 2018.

(51) Int. Cl.

| | |
|---|---|
| *B60R 11/04* | (2006.01) |
| *B60J 1/04* | (2006.01) |
| *G01S 13/86* | (2006.01) |
| *H04N 5/225* | (2006.01) |
| *B60R 7/04* | (2006.01) |
| *E05B 83/28* | (2014.01) |

(Continued)

(52) U.S. Cl.
CPC ............... *B60R 11/04* (2013.01); *B60J 1/04* (2013.01); *B60N 2/305* (2013.01); *B60N 2/3011* (2013.01); *B60R 7/043* (2013.01); *B60R 11/0217* (2013.01); *E05B 83/28* (2013.01); *E05C 9/047* (2013.01); *G01S 13/867* (2013.01); *H04N 5/2252* (2013.01); *H04N 5/2253* (2013.01); *H04R 5/02* (2013.01); *B60N 2/02* (2013.01); *B60N 2/919* (2018.02); *B60Q 3/30* (2017.02); *B60R 2011/0024* (2013.01); *B60R 2011/0026* (2013.01); *E05Y 2900/538* (2013.01); *G01S 2013/93276* (2020.01); *H04R 2420/07* (2013.01); *H04R 2499/13* (2013.01)

(58) Field of Classification Search
CPC ..... B60R 11/04; B60R 7/043; B60R 11/0217; B60J 1/04; B60N 2/3011; B60N 2/305; E05B 83/28; E05C 9/047; G01S 13/867; H04N 5/2252; H04N 5/2253; H04R 5/02
USPC ......................................................... 342/55
See application file for complete search history.

(56) References Cited

U.S. PATENT DOCUMENTS 9,024,804 B2  5/2015  Shi et al.
9,112,278 B2 *  8/2015  Shi ...................... H01Q 25/002
(Continued)

*Primary Examiner* — Frederick D Bailey
*Assistant Examiner* — Matthew David Kim
(74) *Attorney, Agent, or Firm* — Ralph E. Smith

(57) ABSTRACT

A vehicle with sensor enabled features includes a vehicle frame, a windshield movable between a lowered position and a raised position where the windshield is coupled to the vehicle frame, and a forward sensor assembly coupled to the vehicle frame and including a sensor module disposed within a protective housing assembly. The protective housing assembly defines an open end and includes a front cover configured to removably couple to the protective housing assembly to selectively cover the open end. When the windshield is in the raised position, the windshield covers the open end to facilitate protecting the sensor module. When the windshield is in the lowered position, the front cover is configured to cover the open end to facilitate protecting the sensor module.

17 Claims, 8 Drawing Sheets

(51) Int. Cl.
*E05C 9/04* (2006.01)
*B60N 2/30* (2006.01)
*B60R 11/02* (2006.01)
*H04R 5/02* (2006.01)
*B60R 11/00* (2006.01)
*G01S 13/931* (2020.01)
*B60Q 3/30* (2017.01)
*B60N 2/90* (2018.01)
*B60N 2/02* (2006.01)

(56) References Cited

U.S. PATENT DOCUMENTS

| | | | |
|---|---|---|---|
| 2005/0116854 A1* | 6/2005 | Beez | G01S 7/4056 |
| | | | 342/70 |
| 2015/0042874 A1* | 2/2015 | Takeda | B60R 11/04 |
| | | | 348/374 |
| 2016/0216595 A1* | 7/2016 | Carlson | G03B 17/02 |
| 2017/0274832 A1* | 9/2017 | Abe | G01S 7/025 |

* cited by examiner

VEHICLE FORWARD SENSOR MODULE HOUSING AND COVER

CROSS REFERENCE TO RELATED APPLICATIONS

This application claims the benefit of U.S. Provisional Application No. 62/749,880, filed Oct. 24, 2018, the contents of which are incorporated herein in their entirety by reference thereto.

FIELD

The present application relates generally to vehicle sensor assemblies and, more particularly, to a housing and cover for a forward radar sensor module of a vehicle.

BACKGROUND

Some vehicles include an integrated radar and camera system that is coupled to a passenger compartment side of a windshield. Combined packaging of both the radar and camera systems reduces costs and combines inputs, which improves object detection for vehicle safety features such as Lane Departure Warning, Adaptive Cruise Control, autonomous braking, and Forward Collision Warning. However, in some situations such as off-roading, it may be desirable to disable such safety features and/or articulate the windshield without moving the sensor. Thus, while such conventional sensor systems do work well for their intended purpose, there remains a desire for improvement in the relevant art.

SUMMARY

According to one example aspect of the invention, a vehicle with sensor enabled features is provided. In one example configuration, the vehicle includes a vehicle frame, a windshield movable between a lowered position and a raised position where the windshield is coupled to the vehicle frame, and a forward sensor assembly coupled to the vehicle frame and including a sensor module disposed within a protective housing assembly. The protective housing assembly defines an open end and includes a front cover configured to removably couple to the protective housing assembly to selectively cover the open end. When the windshield is in the raised position, the windshield covers the open end to facilitate protecting the sensor module. When the windshield is in the lowered position, the front cover is configured to cover the open end to facilitate protecting the sensor module.

In addition to the foregoing, the described vehicle may include one or more of the following features: wherein the forward sensor assembly is not coupled to the windshield; wherein the vehicle frame is a header extending between a pair of A-pillars, and wherein the forward sensor assembly is coupled to the header; a rearview mirror coupled to the header adjacent the forward sensor assembly; wherein the sensor module comprises a camera and a radar sensor; wherein the protective housing includes a support bracket coupled to the vehicle frame, and a main housing coupled to the support bracket and defining an enclosure for the sensor module.

In addition to the foregoing, the described vehicle may include one or more of the following features: wherein the support bracket comprises a connecting member extending between a pair of arms; wherein a distal end of each arm includes an aperture configured to receive a fastener for coupling the support bracket to the vehicle frame; wherein the connecting member includes one or more apertures configured to receive a fastener for coupling the main housing to the support bracket; wherein each arm includes an aperture configured to receive a fastener for coupling the main housing to the support bracket; and wherein a lower wall of the main housing includes a plurality of tabs extending outwardly therefrom configured to be received within corresponding slots formed in the front cover to facilitate coupling the front cover over the open end.

In addition to the foregoing, the described vehicle may include one or more of the following features: wherein a rear wall of the main housing defines a rear opening configured to removably receive a rear cover; wherein the main housing rear wall defines a first plurality of tabs extending outwardly therefrom configured to engage a second plurality of tabs extending outwardly from the rear cover to facilitate coupling the rear cover to the main housing; wherein the rear cover includes a plurality of fasteners extending outwardly therefrom configured to be received within slots formed in the main housing to facilitate coupling the rear cover to the main housing; wherein the rear cover defines a plurality of vent slots configured to vent the main housing to cool the sensor module; wherein the rear cover defines a clearance slot configured to receive a portion of a rearview mirror therethrough; and wherein the main housing includes a connection portion having a plurality of clips extending therefrom configured to couple to the vehicle frame.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

The present application is directed to a forward sensor assembly that is coupled to a vehicle header rather than a vehicle windshield, thereby enabling the vehicle windshield to be folded down onto the vehicle hood, for example, during off-roading. The forward sensor assembly includes a protective housing with a selectively removable front cover that is attached to the protective housing when the windshield is moved to the downward position to protect and/or disable a forward sensor module.

Figure 1:
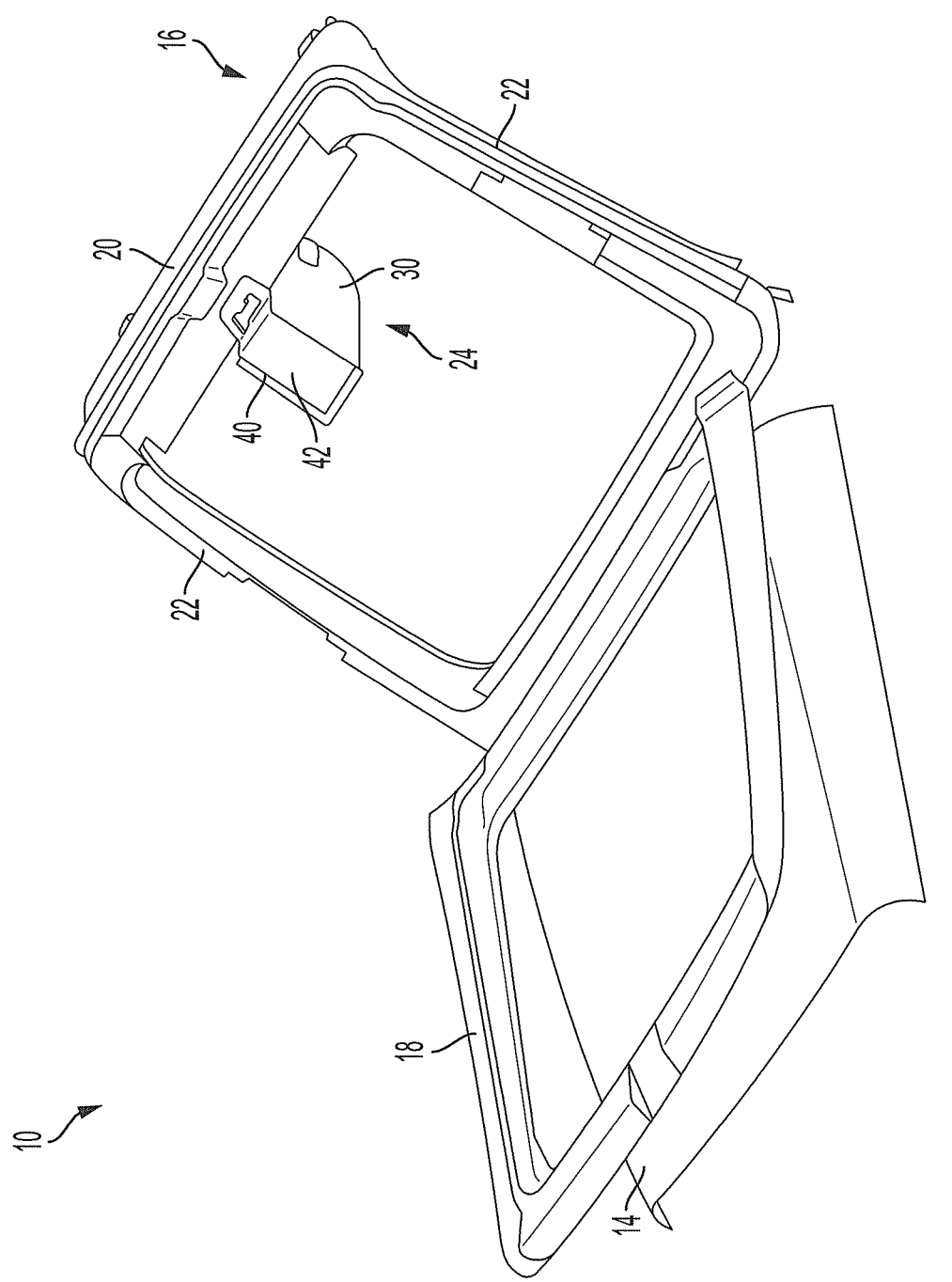
FIG. 1 is a perspective view of an example vehicle having a forward sensor assembly, in accordance with the principles of the present disclosure.

Referring now to the drawings, FIG. 1 illustrates a vehicle 10 generally having a front hood 14, a vehicle body or frame 16, and a windshield 18 movable between a lowered or downward position (shown) and an upward position where the windshield 18 is attached to the vehicle frame 16. In the example embodiment, the vehicle frame 16 includes a header 20 extending between a pair of A-pillars 22. However, it will be appreciated that frame 16 can include any portion of the vehicle body including, for example, sheet metal or hard trim. With additional reference to FIG. 2, a forward sensor assembly 24 and a rearview mirror 26 are coupled to the header 20 at a location behind windshield 18, which gives the sensor assembly an elevated view of the area in front of vehicle 10 without substantially obstructing a view of the vehicle driver.

Figure 2:
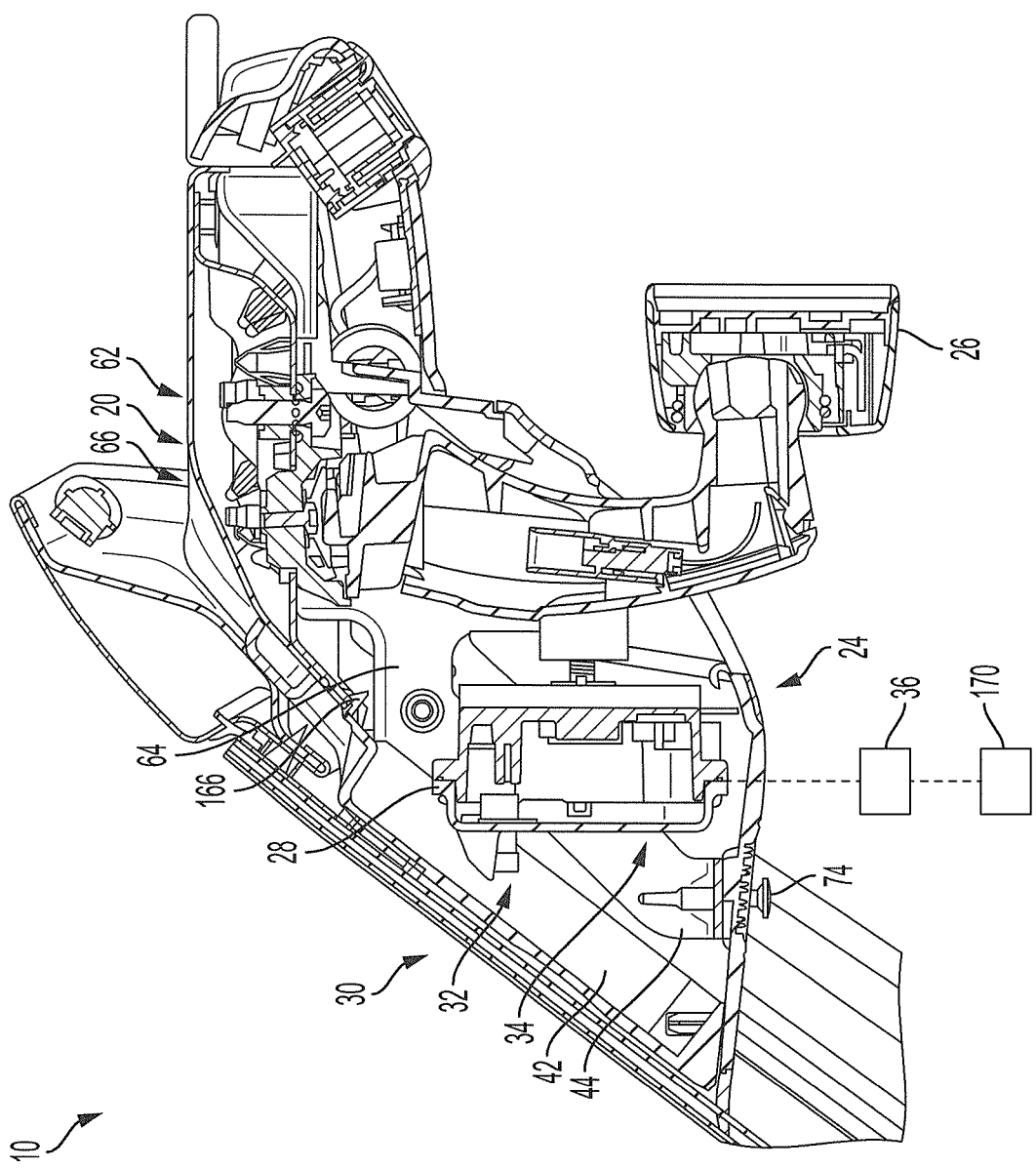
FIG. 2 is a cross-sectional view of one example implementation of the vehicle and forward sensor assembly shown in FIG. 1, in accordance with the principles of the present disclosure.

With continued reference to FIGS. 1 and 2, in the illustrated example, forward sensor assembly 24 generally includes a forward sensor module 28 disposed within a protective housing assembly 30 configured to house and protect the forward sensor module 28. In the example embodiment, forward sensor module 28 generally includes a camera 32 and a radar sensor 34. However, it will be appreciated that sensor module 28 can include various types of sensors. The camera 32 is configured to capture an image based on light waves received from the camera's field of view, and the radar sensor 34 is configured to emit a radar toward a radar field of view as well as receive reflected radar signals from the radar field of view. In this way, objects appearing in front or forward of the vehicle 10 are detected by forward sensor module 28, which is in signal communication with a controller 36 configured to utilize the signal(s) to provide various functions such as forward collision warning, adaptive cruise control, lane departure warning, autonomous braking, or various other vehicle functions. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

Typically, forward sensor modules are attached to a vehicle windshield. However, since windshield 18 is configured to fold down onto the vehicle hood 14 (FIG. 1), it may not desirable to couple the forward sensor module 28 to the windshield 18 where it could be easily damaged when the windshield 18 is in the folded position. Accordingly, the protective housing assembly 30 is configured to enable the forward sensor module 28 to be coupled to the vehicle frame 16 and subsequently provides protection to the forward sensor module 28 when the windshield 18 is in the folded position.

With additional reference to FIGS. 3-7, the protective housing assembly 30 will be described in more detail. As shown in FIG. 1, the protective housing assembly 30 is coupled to the header 20 and not the windshield 18. When in the upward position and coupled to the vehicle frame 16, windshield 18 is disposed against an open end 40 of the protective housing assembly 30, which encloses and protects the forward sensor module 28. However, when the windshield is folded down, the forward sensor module 28 is exposed at the open end 40. In order to prevent objects from damaging the forward sensor module 28, the protective housing assembly 30 is configured to receive a front cover 42 (FIGS. 7-9) at the open end 40, thereby enclosing and protecting the forward sensor module 28. In some examples, the front cover 42 may be transparent to enable continued function of sensor module 28, or the front cover 42 may be opaque to functionally disable the sensor module 28, for example, during off-roading, as described herein in more detail.

Figure 3:
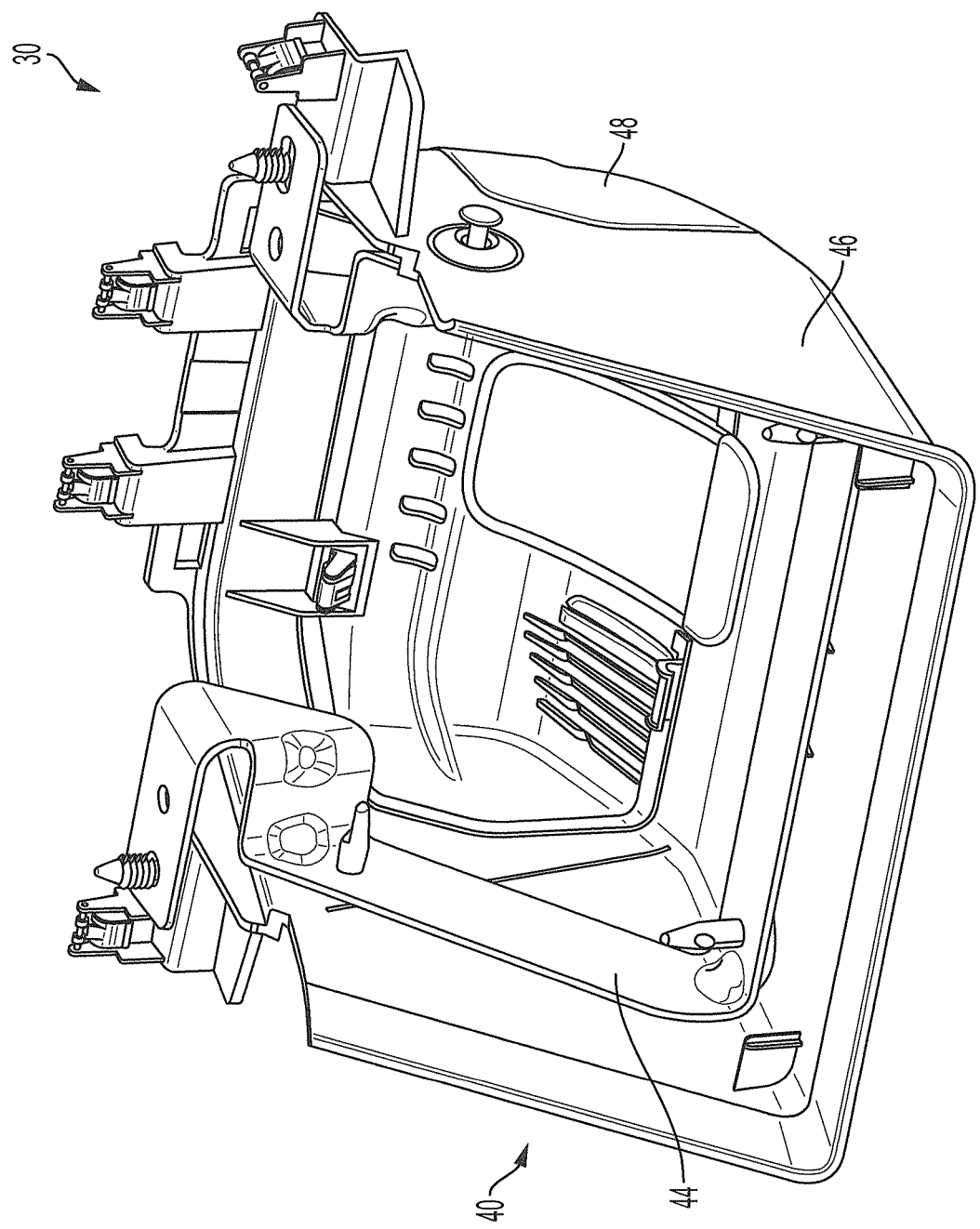
FIG. 3 is a perspective view of a housing assembly of the forward sensor assembly shown in FIG. 2, in accordance with the principles of the present disclosure.
Figure 4:
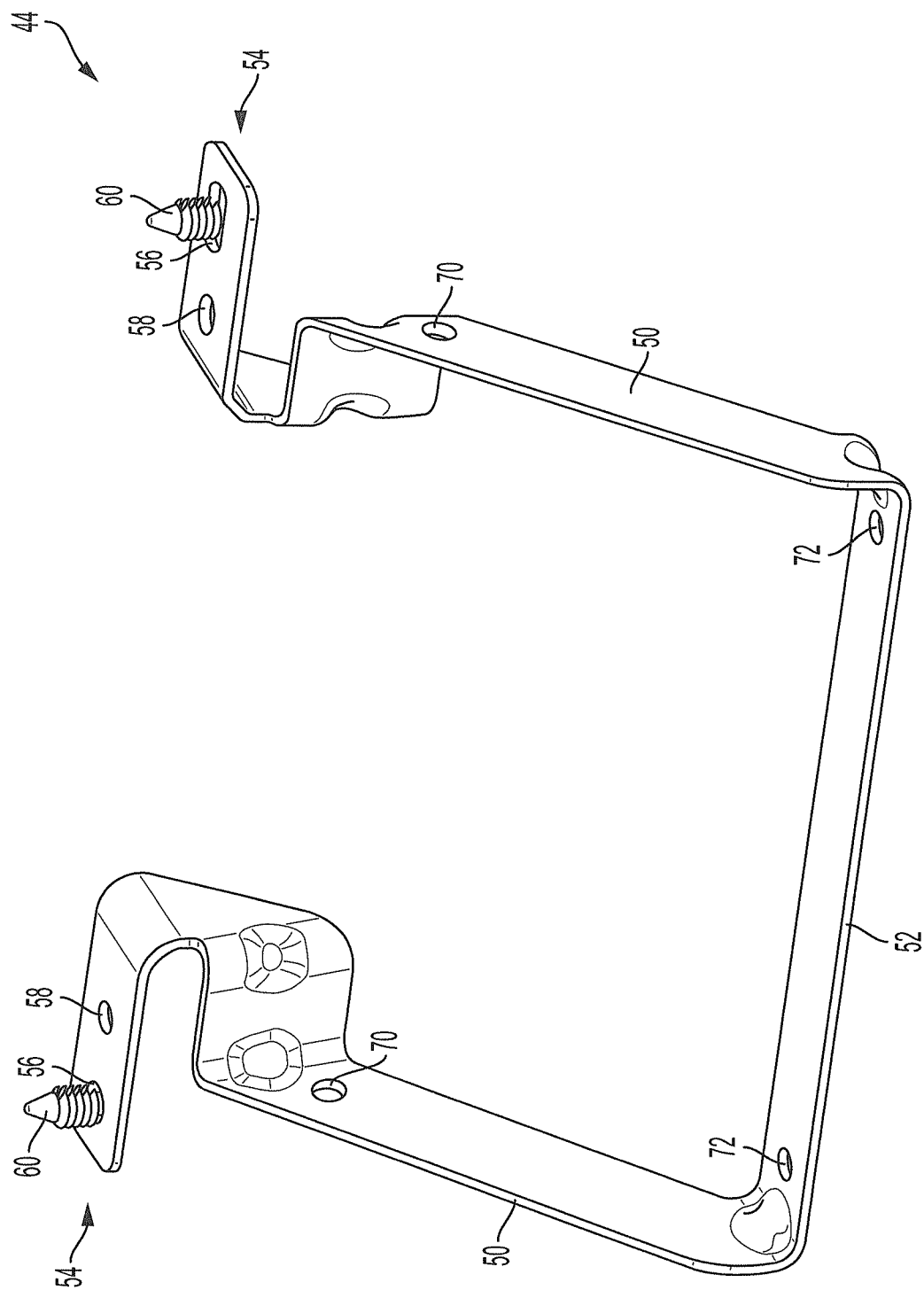
FIG. 4 is a perspective view of an example support bracket of the housing assembly shown in FIG. 3, in accordance with the principles of the present disclosure.

With particular reference to FIG. 3, in the example embodiment, the protective housing assembly 30 generally includes a support bracket 44, a main housing 46, and a rear cover 48. As shown in FIG. 4, the support bracket 44 is generally rectangular and includes two side arms 50 connected by a connecting arm or member 52. A distal end 54 of each side arm 50 includes one or more first apertures 56 and one or more second apertures 58. The first apertures 56 are configured to receive a locator 60 (e.g., assembly aid) for locating and roughly coupling the support bracket 44 to the vehicle frame 16 in a location proximate the rearview mirror 26 (e.g., see FIG. 2). The second apertures 58 are configured to receive a fastener (not shown) for coupling the support bracket 44 to the vehicle frame 16. Similarly, as shown in FIG. 2, the rearview mirror 26 is coupled to the header 20, for example, via a bracket which receives one or more fasteners 62 inserted into the header 20, and the forward sensor module 28 is coupled to the rearview mirror 26 via a bracket 64 and fasteners 66 to reduce or prevent vibration that may compromise the effectiveness of forward sensor module 28. In other examples, forward sensor module 28 may be directly coupled to the header 20 rather than via bracket 64.

Further, as shown in FIG. 4, the side arms 50 include one or more apertures 70 and the connecting member 52 includes one or more apertures 72 each configured to receive fasteners 74 (FIG. 2) for coupling the main housing 46 to the support bracket 44.

Figure 5:
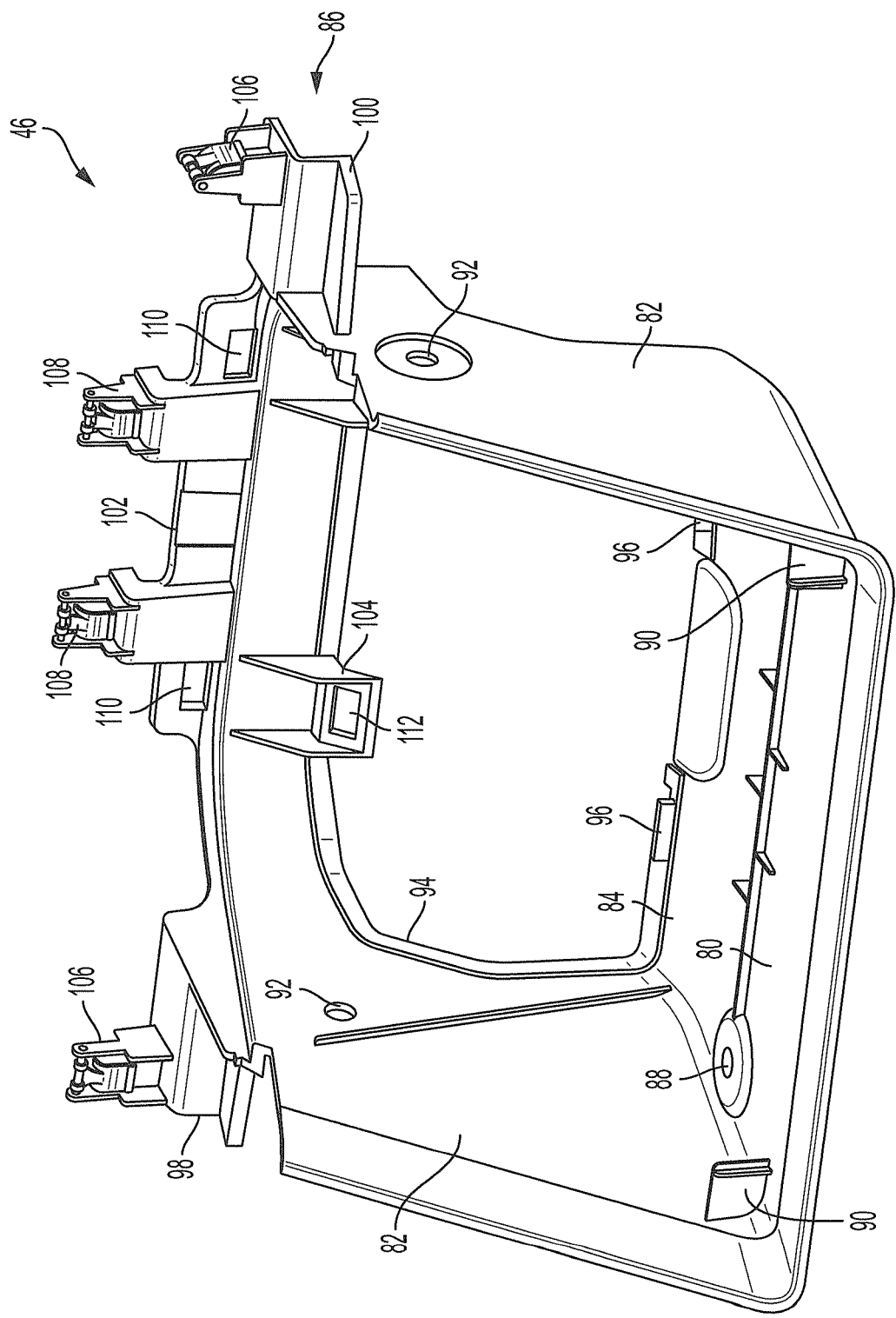
FIG. 5 is a perspective view of an example main protective housing of the housing assembly shown in FIG. 3, in accordance with the principles of the present disclosure.
Figure 9:
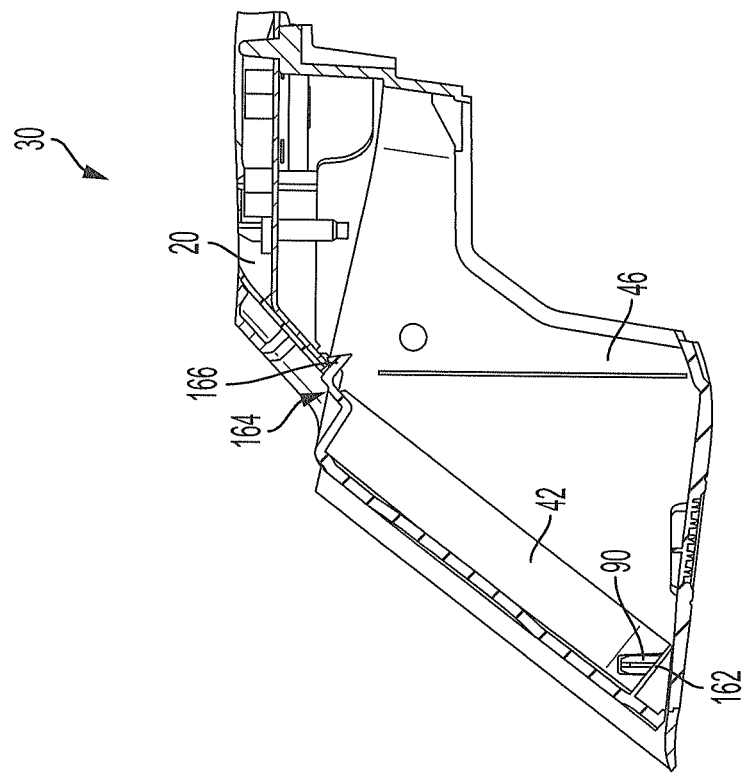
FIG. 9 is a cross-sectional view of the main housing and cover shown in FIG. 3 in a covered position, in accordance with the principles of the present disclosure.

As shown in FIGS. 3 and 5, main housing 46 generally includes a bottom wall 80, a pair of side walls 82, a rear wall 84, and a connecting portion 86. The bottom wall 80 includes a pair of apertures 88 and a pair of tabs 90. The apertures 88 are configured to receive fasteners 74 therethrough for coupling the main housing 46 to the support bracket 44, and tabs 90 are configured to interact with and guide the front cover 42 into place for attachment with the main housing 46, for example, as shown in FIG. 9. The side walls 82 include one or more apertures 92 each configured to receive one fastener 74 for further coupling the main housing 46 to the support bracket 44. As such, main housing 46 is secured to the bracket 44 in two different planes, thereby providing increased stabilization and support.

In the example embodiment, the rear wall 84 defines a rear opening 94 and a plurality of tabs 96. The rear opening 94 is sized and shaped and configured to receive the rear cover 48, and the tabs 96 are configured to interact with and guide the rear cover 48 into place for attachment with the main housing 46, for example, as shown in FIG. 3. The connecting portion 86 defines a pair of opposed side tabs 98, 100, a rear flange 102, and a pair of internal tabs 104. The opposed side tabs 98, 100 each include a fastener 106 (e.g., a clip) and the rear flange 102 includes one or more fasteners 108 for further coupling of the main housing 46 to the vehicle frame 16. Additionally, the rear flange 102 defines one or more slots 110 to facilitate coupling the main housing 46 to the header 20. For example, slots 110 may be configured to receive clips on a header trim (not shown) for preassembly thereto, and the header trim is then coupled to sheet metal of the header 20. The internal tabs 104 each define a slot 112 configured to receive a portion of the rear cover 48 for coupling thereto.

Figure 6:
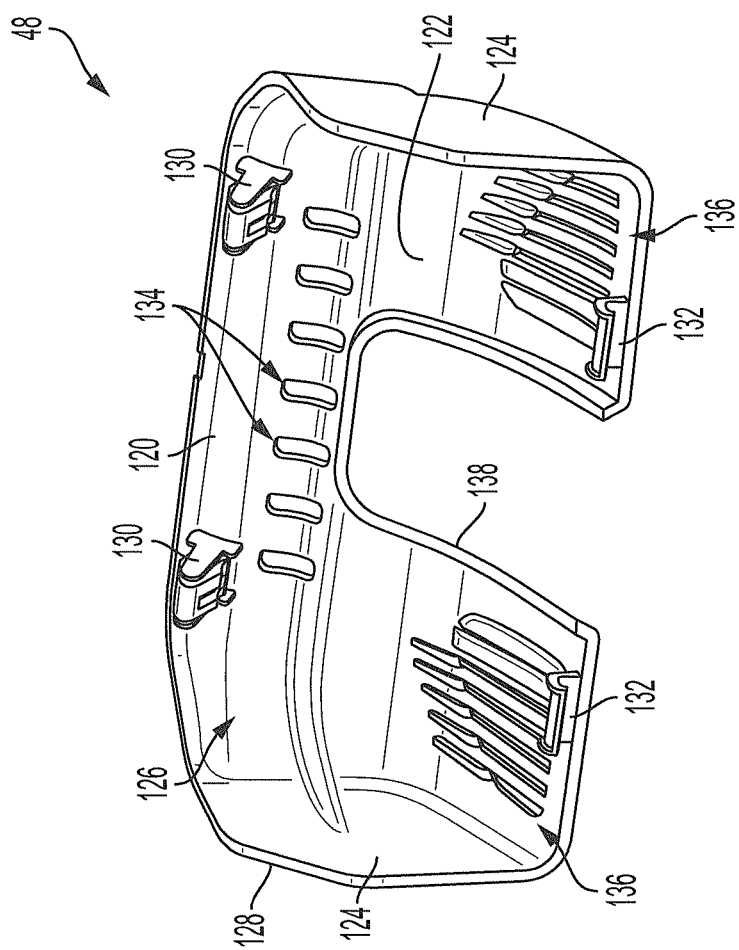
FIG. 6 is a perspective view of an example rear cover of the housing assembly shown in FIG. 3, in accordance with the principles of the present disclosure.

With continued reference to FIGS. 3 and 6, the rear cover 48 is configured to couple to the main housing 46 at the rear opening 94 and generally includes an upper wall 120, a lower wall 122, a pair of side walls 124, an inner surface 126, and an outer surface 128. In the example embodiment, the inner surface 126 of upper wall 120 includes fasteners 130 (e.g., clips) extending outwardly therefrom, and the inner surface 126 of lower wall 122 includes tabs 132 extending outwardly therefrom. The tabs 132 are configured to engage and rotate around the main housing tabs 96 to facilitate locating and coupling the rear cover 48 to the main housing 46. The fasteners 130 are configured to be received within the slots 112 of the main housing internal tabs 104 for further locating and coupling of the rear cover 48 to the main housing 46. Additionally, the upper wall 120 includes a plurality of air vents 134, and the lower wall 122 includes a plurality of air vents 136 and a clearance slot 138. In the example embodiment, the air vents 134, 136 facilitate cooling of the forward sensor module 28 while in the protective housing assembly 30, and the clearance slot 138 provides clearance for the rearview mirror 26. For example, during assembly, the rearview mirror 26 is inserted through the clearance slot 138 and coupled to a bracket that is coupled to the header via fasteners 62. Such a coupling can be provided, for example, by the rearview mirror 26 being operably associated with the bracket and coupled thereto with a quarter turn quick connect.

Figure 7:
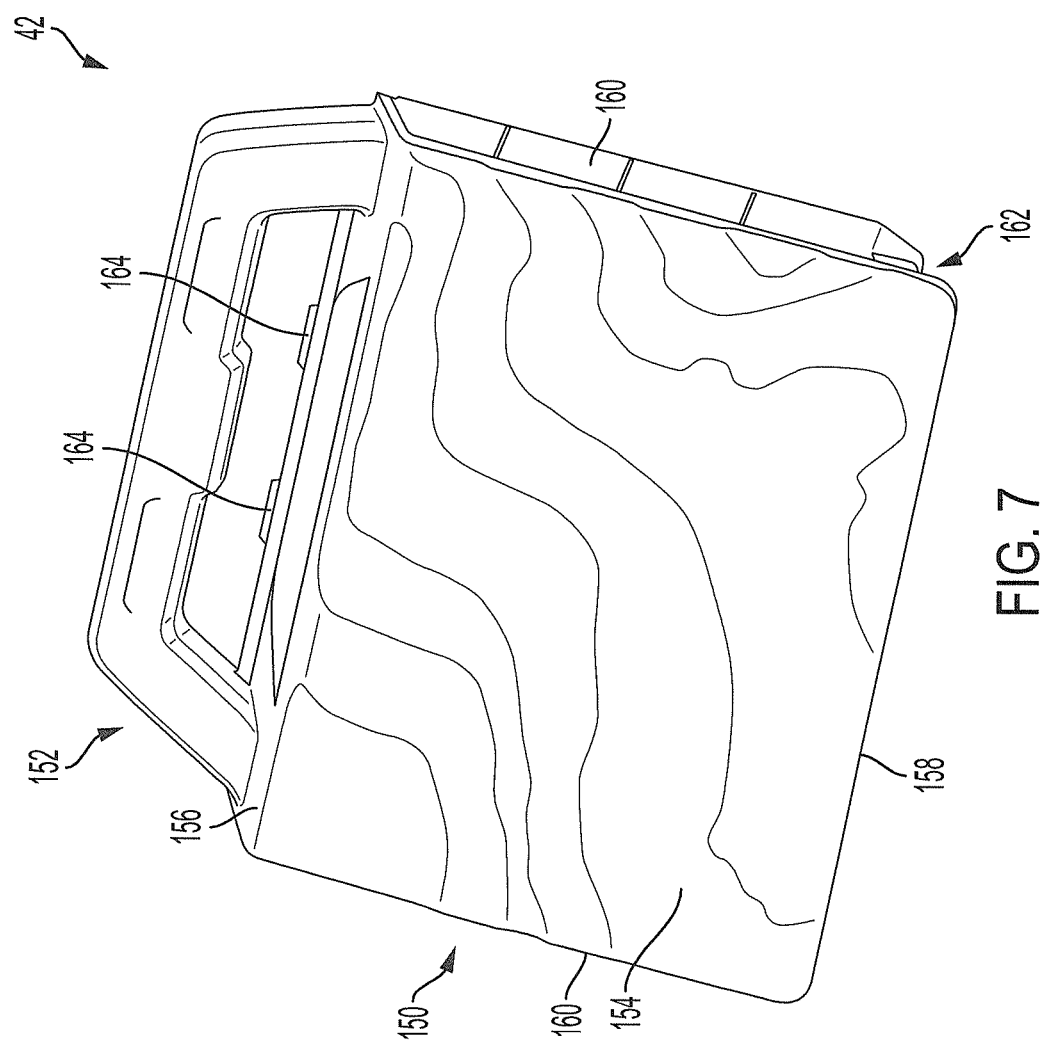
FIG. 7 is a perspective view of an example front cover of the housing assembly shown in FIG. 2, in accordance with the principles of the present disclosure.
Figure 8:
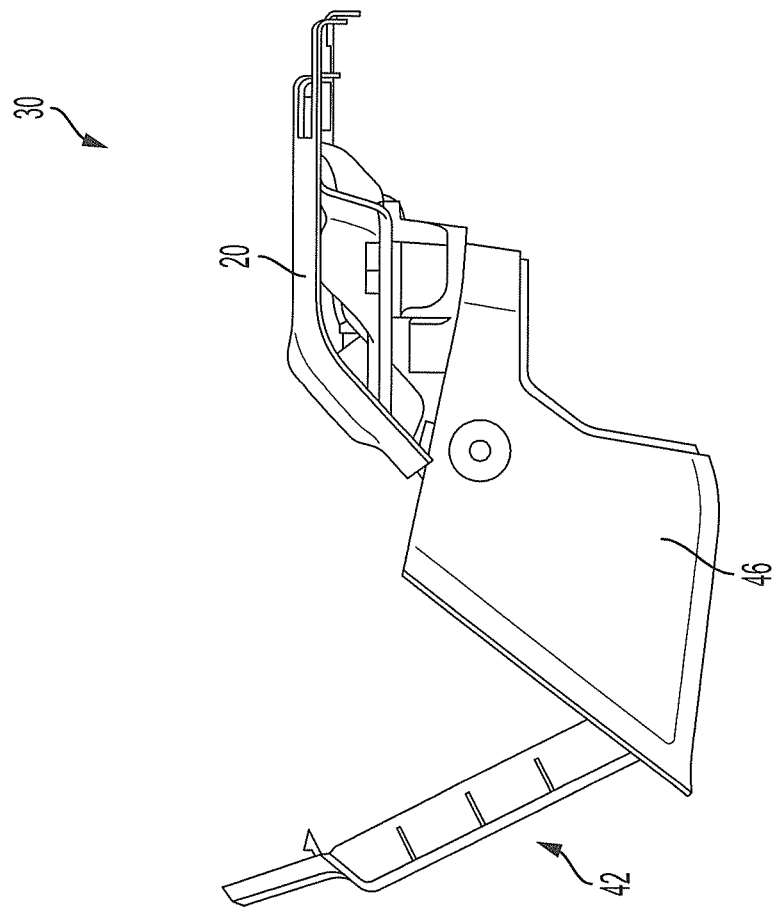
FIG. 8 is a side view of a main housing and cover of the forward sensor assembly of FIG. 1, in accordance with the principles of the present disclosure.

With reference now to FIGS. 7-9, in the example embodiment, the front cover 42 generally includes a main cover portion 150 and a handle portion 152. The main cover portion 150 includes a front wall 154, a top wall 156, a bottom wall 158, and side walls 160. As shown in FIG. 8, the bottom wall 158 includes one or more slots 162, and the top wall 156 includes one or more retention features 164 (e.g., clips). In the example embodiment, slots 162 are configured to be placed over and receive main housing tabs 90 to facilitate locating the front cover 42 relative to the main housing 46 and for coupling thereto. The retention features 164 are configured to interact with and engage features on the main housing 46 and/or vehicle body 16 to thereby removably couple the front cover 42 to the main housing 46. For example, as illustrated in FIG. 9, retention features 164 include a retention tab 166 configured to engage an edge of the header 20 for securing the front cover 42 to the main housing 46.

In some embodiments, the vehicle may have one or more sensors/controllers (e.g., controller 36, FIG. 2) configured to detect if the windshield 18 is down and/or if the front cover 42 is not attached to main housing 46. In such arrangements, the controller 36 is configured to subsequently warn or alert a user (e.g., via a vehicle display screen/user interface 170, FIG. 2) to attach the front cover 42 to the main housing 46 to facilitate reducing the amount of time the front sensor module 28 is unprotected.

Described herein are systems and methods for providing a vehicle with a lowerable windshield to further include a forward sensor assembly that enables additional vehicle functions such as object detection. Rather than conventionally coupling the forward sensor assembly to the vehicle windshield, the forward sensor assembly described herein is provided with a protective housing assembly coupled directly to the vehicle body proximate the rearview mirror. When raised, the windshield covers an open end of the protective housing assembly to provide protection to the forward sensor module therein. When the windshield is lowered, a front cover, which may be stored somewhere in/on the vehicle, is coupled over the open end to protect the forward sensor module. In some situations where it is desirable to disable the forward sensor module, for example during off-roading, the front cover is utilized to disable the forward sensor module or prevent sensing thereof.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle having sensor enabled features, the vehicle comprising:
a vehicle frame;
a windshield movable between a lowered position and a raised position where the windshield is coupled to the vehicle frame;
a forward sensor assembly coupled to the vehicle frame and including a sensor module disposed within a protective housing assembly, wherein the protective housing assembly defines an open end facing the windshield; and
a front cover configured to removably couple to the protective housing assembly to selectively cover the open end,
wherein when the windshield is in the raised position, the windshield covers the open end to facilitate protecting the sensor module, and
wherein when the windshield is in the lowered position, the front cover is configured to cover the open end to facilitate protecting the sensor module during use of the vehicle with the windshield in the lowered position.

2. The vehicle of claim 1, wherein the forward sensor assembly is free from being coupled to the windshield.

3. The vehicle of claim 1, wherein the vehicle frame is a header extending between a pair of A-pillars, and wherein the forward sensor assembly is coupled to the header.

4. The vehicle of claim 3, further comprising a rearview mirror coupled to the header adjacent the forward sensor assembly.

5. The vehicle of claim 1, wherein the sensor module comprises a camera and a radar sensor.

6. The vehicle of claim 1, wherein the protective housing comprises:
a support bracket coupled to the vehicle frame; and
a main housing coupled to the support bracket and defining an enclosure for the sensor module.

7. The vehicle of claim 6, wherein the support bracket comprises a connecting member extending between a pair of arms.

8. The vehicle of claim 7, wherein a distal end of each arm includes an aperture configured to receive a fastener for coupling the support bracket to the vehicle frame.

9. The vehicle of claim 7, wherein the connecting member includes one or more apertures configured to receive a fastener for coupling the main housing to the support bracket.

10. The vehicle of claim 7, wherein each arm includes an aperture configured to receive a fastener for coupling the main housing to the support bracket.

11. The vehicle of claim 6, wherein a lower wall of the main housing includes a plurality of tabs extending outwardly therefrom configured to be received within corresponding slots formed in the front cover to facilitate coupling the front cover over the open end.

12. The vehicle of claim 6, wherein a rear wall of the main housing defines a rear opening configured to removably receive a rear cover.

13. The vehicle of claim 12, wherein the main housing rear wall defines a first plurality of tabs extending outwardly therefrom configured to engage a second plurality of tabs extending outwardly from the rear cover to facilitate coupling the rear cover to the main housing.

14. The vehicle of claim 12, wherein the rear cover includes a plurality of fasteners extending outwardly therefrom configured to be received within slots formed in the main housing to facilitate coupling the rear cover to the main housing.

15. The vehicle of claim 12, wherein the rear cover defines a plurality of vent slots configured to vent the main housing to cool the sensor module.

16. The vehicle of claim 12, wherein the rear cover defines a clearance slot configured to receive a portion of a rearview mirror therethrough.

17. The vehicle of claim 7, wherein the main housing includes a connection portion having a plurality of clips extending therefrom configured to couple to the vehicle frame.

* * * * *